F. E. WILCOX.
VEHICLE GEAR.
APPLICATION FILED AUG. 6, 1913.
1,128,276.
Patented Feb. 9, 1915.
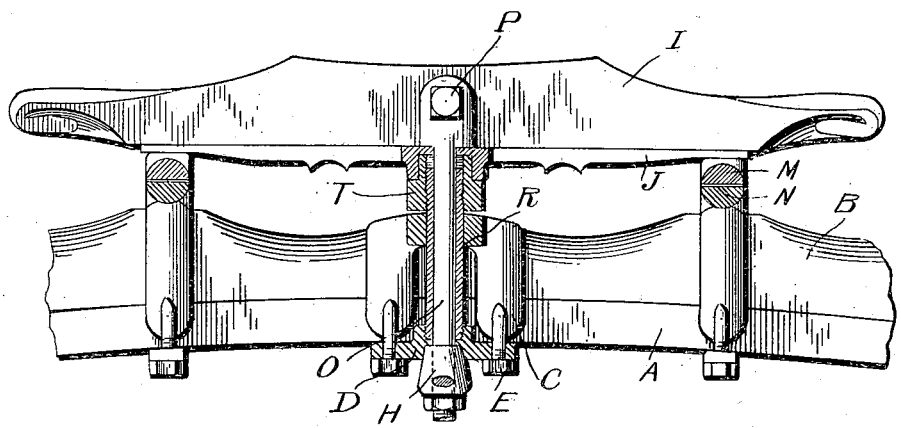
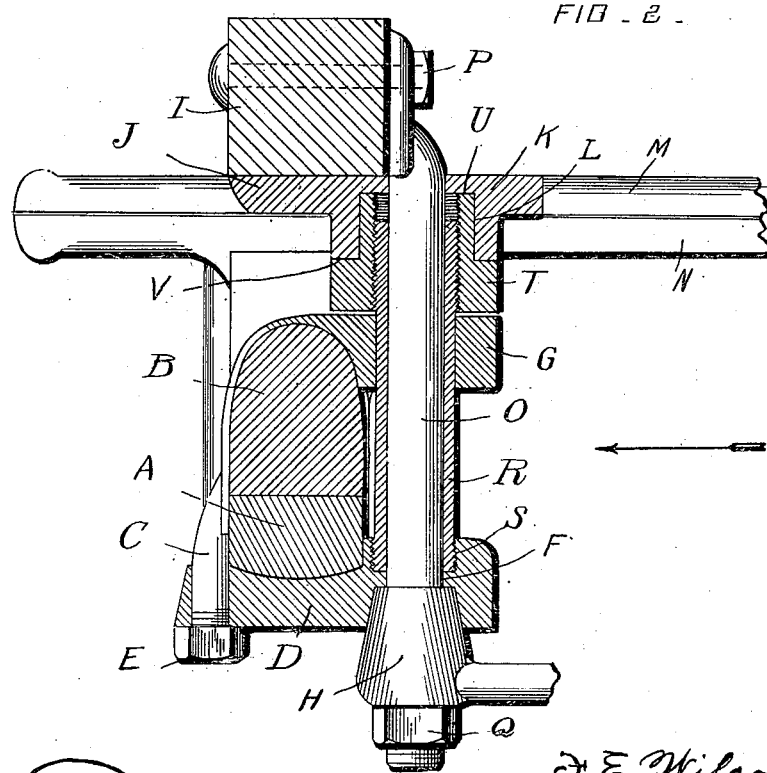

UNITED STATES PATENT OFFICE.

FRANK E. WILCOX, OF MECHANICSBURG, PENNSYLVANIA.

VEHICLE-GEAR.

1,128,276.   Specification of Letters Patent.   Patented Feb. 9, 1915.

Application filed August 6, 1913.   Serial No. 783,338.

*To all whom it may concern:*

Be it known that I, FRANK E. WILCOX, a citizen of the United States, residing at Mechanicsburg, in the county of Cumberland and State of Pennsylvania, have invented certain new and useful Improvements in Vehicle-Gears, of which the following is a specification.

The object of my invention is the provision, generally in connection with a vehicle gear provided with a head block plate having a perforated lug, upper and lower fifth wheel members located between the head block plate and axle or axle bed, a king bolt clip with a perforated head, a threaded tube, connecting the head of the clip and the yoke, and a king bolt, of means for raising the head block plate and upper member of the fifth wheel so the frictional contact of the fifth wheel members will not be excessive, and so, when desired, the superimposed weight may be supported by the tube, said means to be so constructed that the adjustment may be made after the parts of the gear are assembled. In use the excessive frictional contact of the fifth wheel members prevents the easy turning of one member relative to the other, and my invention is designed to obviate this objectionable feature of operation by wholly or partially supporting the weight normally upon the tube, which in turn is supported by the king bolt clip and the axle yoke. By the use of my invention the excessive wear of the fifth wheel members is prevented and the service of the fifth wheel members is extended for a period of five or six years.

My invention consists in certain novelties of construction and combinations of parts as hereinafter set forth and claimed.

The accompanying drawing illustrates an example of the embodiment of the invention constructed and combined with the tube uniting the clip and yoke and the head block plate lug according to one of the best modes of procedure I have so far devised for the purpose.

Figure 1 is a view in elevation of the entire gear, the fifth wheel members being in section as well as parts adjacent to the king bolt, as seen when looking in the direction of the arrow, Fig. 2. Fig. 2 is a section of the vehicle gear on a vertical plane adjacent to the king bolt.

Referring to the figures, the letter A designates the axle; B, the axle bed; C, an integral three-pronged king bolt clip; D, the axle yoke; E, the nuts on the threaded prongs; F, the hole in the yoke for the king bolt; G, the perforated head of the king bolt clip; H, the perforated brace head; I, the head block; J, the head block plate; K, the perforated lug of the plate; L, a recess at the under surface of the lug; M, the upper member of the fifth wheel secured to the head block plate; N, the lower member of the fifth wheel secured to the axle bed; O, the king bolt; P, a bolt which secures the top end of the king bolt to the head block; and Q is a nut at the lower end of the king bolt.

The means for adjusting comprises a tube R threaded at the ends, the lower threaded end engaging a threaded recess S in the axle yoke and the upper threaded end carrying a threaded nut T having an end U seated within the recess L and a bearing surface V in frictional contact with the under surface of the lug K, as shown. The nut may be angular or be provided with holes to receive a wrench or tool for turning the same on the tube after the nut Q at the end of the king bolt has been lowered, so as to raise the head block plate and the upper fifth wheel member out of contact with the lower member or to relieve the excessive frictional contact of the two members to a degree which will permit the easy turning of the lower member relative to the upper member in the arc of a circle.

The drawing shows the fifth wheel members slightly separated and the weight carried by the nut and tube which insures the easy turning of the front wheels and axle and without excessive wear of the fifth wheel members.

From the foregoing description taken in connection with the drawing it is clear that I have provided adjusting means of a very simple and effective character which can be manipulated after the parts of the gear are assembled and by the use of a wrench or analogous tool.

What I claim is:

1. The combination of a king bolt clip having a perforated head, an axle yoke with a recess, a tube with a threaded end, said tube being removably located within the perforation in the king bolt clip head and its lower end seated within the recess in the axle yoke, a threaded nut upon the threaded end of the tube, said nut bearing against the lug of the head block plate, and a king bolt passed through the lug of the head block plate, tube and axle yoke.

2. The combination in a vehicle gear, of a clip with a perforated head, an axle yoke with a threaded seat, a tube with both ends threaded, a head block plate with a perforation, an adjustable nut on the top threaded end of the tube, and a king bolt passed through the perforation of the head block plate, tube and nut, and the axle yoke; the lower threaded end of the tube being located within the threaded seat of the yoke, and the tube removably supported within the perforated head of the clip.

In testimony whereof I affix my signature in presence of two witnesses.

FRANK E. WILCOX.

Witnesses:
A. D. ALBERT,
J. E. HOERNER.

Copies of this patent may be obtained for five cents each, by addressing the "Commissioner of Patents, Washington, D. C."